Feb. 11, 1930.  J. B. GREEN  1,747,000
FILLER ROD FOR WELDING AND BRAZING PROCESSES
Filed May 1, 1926
Fig. 1.
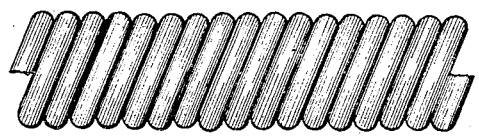
Fig. 2.  Fig. 3.  Fig. 4.
  
Fig. 5.
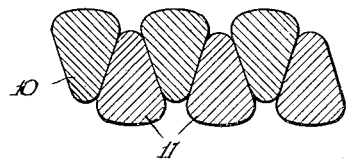
Inventor:
J. Birchard Green,
By Cromwell Heist & Warder
Attys.
Witness:
A. Burkhardt Patented Feb. 11, 1930

1,747,000

UNITED STATES PATENT OFFICE

J BIRCHARD GREEN, OF CHICAGO, ILLINOIS

FILLER ROD FOR WELDING AND BRAZING PROCESSES

Application filed May 1, 1926. Serial No. 105,923.

The present invention has to do with filler rods for use in fusion welding and brazing processes, but more particularly to an electrode especially designed for metallic arc welding purposes.

In metallic arc welding, the electrode is advanced toward the work as it melts either by movement of the holder in which the electrode is secured or by ejecting the electrode from the holder or working tool. In either case the electrode is gripped by the holder and the latter constitutes the means of applying the electric current to the electrode. In cases where the electrode is ejected, as by feed rolls, reciprocating grippers or the like, the feeding means are made auxiliary contactors and in those operations the surface of the electrode must be such as to permit establishment of the best possible electrical contact, and this requirement precludes the use of full flux coatings, which, in many cases, are desired for producing certain arc effects and qualities in the deposit metal.

An object of the present invention is to provide a filler rod suitable for use in a feeding tool which will permit of good electrical contact over the entire surface engaged by the contactor and which shall also provide a substantial quantity of flux or other material desired for arc and filler purposes.

Another object of the invention is to provide an electrode having characteristics which will be conductive to a positive and steady feed from the holder or tool and which may be easily and conveniently handled in the operation.

A further object is to provide an electrode suitable for continuous feed which shall present an increased surface for electrical contact per unit of length, thus permitting the introduction of higher electrical currents.

Still another object is the provision of a filler rod with which the desired flux may be readily associated and introduced into the weld.

Further objects, advantages and embodiments of the invention will be suggested by the disclosure in the following specification and the accompanying drawings in which I submit, for purposes of illustration, several forms of rods which are adapted for general use as well as for special use in metallic arc welding. The special reference to the illustrative embodiments is not to be construed in any sense, as a limitation upon the protection for the invention which I seek through the appended claims, for I wish to be understood as making claim to the exclusive right to all forms in which the invention may be incorporated and all uses to which it may be applied.

With this understanding I will state that the invention contemplates a filler rod which is hollow and flexible as opposed to the solid rods heretofore used, and which has a screwthreaded uncoated exterior surface rather than the plain, or longitudinally grooved, coated surface characteristic of the products of the prior art. A filler rod of the improved type may be made in several diffent ways, some of which are illustrated by the drawings, in which Fig. 1 represents the most simple embodiment of the invention;

Figs. 2 and 3 are sectional views of special wires which may be used for making the electrode;

Fig. 4 shows a special winding of the wire illustrated in Fig. 3, and

Fig. 5 shows an advantageous arrangement for winding a pair of specially formed wires.

As shown in Fig. 1, a length of round wire is helically wound, under tension, into a tight closed as distinguished from open coil. As the wire is coiled, a flux of any desired composition may be fed into the interior of the coil through the winding mandrel which is made hollow for this purpose. The flux coatings in most general use at the present are composed of silicon dioxide and calcium carbonate, the adhering to property being provided by the addition of sodium silicate. The helical winding presents an exterior surface which may be employed advantageously in connection with screw threaded feeding means, such, for example, as disclosed in my copending application, Serial No. 105,924 filed May 1, 1926. The interior wall of the coil provides an ideal surface to which the flux may adhere and within which any desired quantity of flux may be contained and kept intact. By applying the flux coating to the inner surface of the coil, the outer surface is capable of providing the best possible electrical contact, in fact an electrical conductor such as graphite powdered metals may be applied to the clean exposed surface of such an electrode for improving the contact.

Where a round wire is used, as in Fig. 1, it is evident that there will be merely a line contact between the coils of the electrode, and, if it is desired to carry heavy currents through the whole electrode, such line contact may not be sufficient, as the current tends to flow around the coils, thus heating the wire. Consequently, in many cases, it will be desirable to use a flat wire such as is shown in Fig. 2 to increase the area of contact. A thin flat wire such as is shown in Fig. 3 not only gives this increased area of contact but adds extreme flexibility to the electrode. By using flat wires of varying profile and by varying the gauge of such wires or the gauge of the coil, it is possible to produce an electrode of almost any desired degree of flexibility with any desired screw pitch and of any usable proportions of metal and flux or other material to be added.

In Fig. 4 the coils are shown as overlapping, and this arrangement provides for the utilization of a variety of profiles to provide for differing areas of contact, different screw pitches and variations in the ratio of metal to flux.

The arrangement of Fig. 5 contemplates the winding of two wires at a time. These wires 10 and 11 are shown as substantially triangular in cross section and are arranged so that their adjacent side faces will interfit. These wires may be of slightly different temper, or may be wound under slightly different tensions, so that in the finished coil each wire will have a tendency to wedge itself between the coils of the other.

The advantage of winding more than one wire into the coil at the same time provides for a multiple thread screw, thus aiding the feeding and permitting greater latitude in controlling the pitch, and it also permits of the introduction of metals of more than one composition into the electrode, which may be alloyed more advantageously in the arc than elsewhere and which might beneficially influence the working characteristics of the arc.

It is characteristic with all of the forms which I have shown that the corrugations or threads on the surface are of advantage for feeding and contact purposes and the corresponding interior surface provides ideal pockets for the flux or other materials to be added.

Filler rods made in accordance with the invention may be produced on many of the machines now in use for making coil springs, flexible tubing and the like. Some of this machinery is provided with rolls and dies for converting round wire to any desirable profile during the winding operation. In order to introduce the flux, the winding mandrel of these machines would be made hollow. Certain other refinements in the operation of the machine are desirable, but as the machine forms no part of this invention the changes will not here be detailed.

Filler rods such as have been described, have their maximum efficiency in connection with continuous feed metallic arc welding processes, but they also have many advantages over the filler rods now used, in carbon arc welding, in gas welding and in brazing. They may be formed in any suitable lengths, and, because of their extreme flexibility, maximum of surface for electrical contact, and the provision for carrying the flux interiorly, they offer decided advantages over all prior forms of filler material.

For example, in the gas welding field, there has been a demand for flux in the weld, but with the flux applied to the filler rod as a surface coating as in the past, the flame blows most of it away. The alternative has been to heap excess quantities of flux on the work and to utilize whatever quantity is not blasted away. This at best is a wasteful haphazard and expensive practice. With the new rod the flux being carried within and protected by the surrounding metal, it can be applied accurately to the weld. There are also obvious points of advantage in connection with carbon arc welding. The hollow rod may be utilized for introducing hydrogen or other gas into the arc stream and for other special processes it will have special adaptability.

I claim:

1. A filler rod for use in welding and brazing processes comprising a closed coil of wire in which adjoining loops have extended as distinguished from line contact with each other.

2. A filler rod for use in welding and brazing processes comprising a hollow closed coil of flat faced wire.

3. A filler rod for use in welding and brazing processes comprising a hollow coil of wire, with a supply of flux contained within the coil.

4. A filler rod for use in welding and brazing processes comprising a plurality of wires arranged in a hollow closed coil of uniform diameter, with a quantity of flux contained within the coil.

5. A filler rod for use in welding and brazing having a screw threaded surface for co-operation with suitable feeding means.

6. An electrode for use in arc welding, comprising a closed coil of wire having a helical groove in its outer surface for cooperation with suitable feeding means.

7. An electrode for use in arc welding, comprising a hollow closed coil of wire which is flexible and contains a supply of flux.

In testimony whereof I have hereunto subscribed my name.

J BIRCHARD GREEN.